(12) United States Patent
Kurata (10) Patent No.: US 9,352,616 B2
(45) Date of Patent: May 31, 2016

(54) PNEUMATIC TIRE (75) Inventor: Takayuki Kurata, Kokubunji (JP)

(73) Assignee: BRIDGESTONE CORPORATION, Tokyo (JP)

( * ) Notice: Subject to any disclaimer, the term of this patent is extended or adjusted under 35 U.S.C. 154(b) by 109 days.

(21) Appl. No.: 13/883,665

(22) PCT Filed: Nov. 14, 2011

(86) PCT No.: PCT/JP2011/006344
§ 371 (c)(1),
(2), (4) Date: May 6, 2013

(87) PCT Pub. No.: WO2012/066766
PCT Pub. Date: May 24, 2012

(65) Prior Publication Data
US 2013/0220504 A1    Aug. 29, 2013

(30) Foreign Application Priority Data

Nov. 16, 2010    (JP) .................. 2010-255768

(51) Int. Cl.
B60C 9/18    (2006.01)
B60C 9/28    (2006.01)
B60C 9/30    (2006.01)
B60C 5/00    (2006.01)
B60C 9/22    (2006.01)
B60C 9/20    (2006.01)

(52) U.S. Cl.
CPC .................. *B60C 5/00* (2013.01); *B60C 9/2006* (2013.04); *B60C 9/22* (2013.01); *B60C 9/28* (2013.01); *B60C 9/30* (2013.01); *B60C 2011/0033* (2013.04); *B60C 2200/04* (2013.04); *B60C 2200/06* (2013.04); *Y10T 152/10495* (2015.01)

(58) Field of Classification Search
CPC ............ B60C 11/00; B60C 9/18; B60C 9/28; B60C 9/30
See application file for complete search history.

(56) References Cited

U.S. PATENT DOCUMENTS 6,305,450 B1    10/2001  Guermandi
8,091,600 B2 *   1/2012  Kobayashi ............... 152/532
2008/0271829 A1 11/2008  Kobayashi

FOREIGN PATENT DOCUMENTS

| GB | 2002699 | * | 2/1979 |
|---|---|---|---|
| JP | 61-228940 A | | 10/1986 |
| JP | 3-65404 A | | 3/1991 |
| JP | 5-58113 | * | 3/1993 |
| JP | 5-319016 | * | 12/1993 |
| JP | 6-255317 A | | 9/1994 |
| JP | 7-25203 | * | 1/1995 |
| JP | 7-61208 | * | 3/1995 |
| JP | 7-144509 A | | 6/1995 |
| JP | 8-2209 A | | 1/1996 |
| JP | 10-147109 A | | 6/1998 |
| JP | 2001-138712 A | | 5/2001 |
| JP | 2001-294016 | * | 10/2001 |

(Continued)

OTHER PUBLICATIONS

International Search Report for PCT/JP2011/006344 dated Feb. 21, 2012, English Translation.
Japanese Office Action dated Oct. 28, 2014 issued in corresponding Japanese Patent Application No. 2012-544108, English-language Translation.

(Continued)

*Primary Examiner* — Justin Fischer
(74) *Attorney, Agent, or Firm* — Sughrue Mion, PLLC (57) ABSTRACT In a tire according to the present invention, the shape of the outermost reinforcing layer in the tire radial direction is optimized.

6 Claims, 8 Drawing Sheets

(56) References Cited

FOREIGN PATENT DOCUMENTS

| | | | |
|---|---|---|---|
| JP | 2001-301420 | A | 10/2001 |
| JP | 2001-354013 | * | 12/2001 |
| JP | 2003-94913 | A | 4/2003 |
| JP | 2004-98934 | * | 4/2004 |
| JP | 2005-246629 | * | 9/2005 |
| WO | WO 2006/103831 | * | 10/2006 |

OTHER PUBLICATIONS

Communication dated Mar. 23, 2015 from the State Intellectual Property Office of People's Republic of China in counterpart Application No. 201180064682.7.

Communication dated Sep. 25, 2015 from the State Intellectual Property Office of the People's Republic of China in counterpart application No. 201180064682.7.

* cited by examiner

PNEUMATIC TIRE

TECHNICAL FIELD

The present invention relates to a pneumatic tire, and in particular to a pneumatic tire for passenger cars that enhances resistance to uneven wear.

BACKGROUND ART

In general, pneumatic tires have a structure such that the crown portion is curved, with the radius of the tread portion growing smaller from the center region towards the shoulder portions.

Due to this difference in radius in the tire width direction, a difference in rolling speed occurs in the tire width direction when the tire is rolling. In particular, the difference in rolling speed becomes pronounced between the center region and the shoulder portions, and the circumferential shear force becomes uneven in the tire width direction.

In particular, a large shear force is generated in the braking direction at the shoulder portions. Due to this shear force, wear progresses in the tread rubber at the shoulder portions, leading to local wear, i.e. uneven wear.

Moreover, when a load is applied to a tire with the above difference in radius, the contact pressure increases at the outside in the width direction, in particular at the contact edge, providing another reason why uneven wear progresses.

Figure 1:
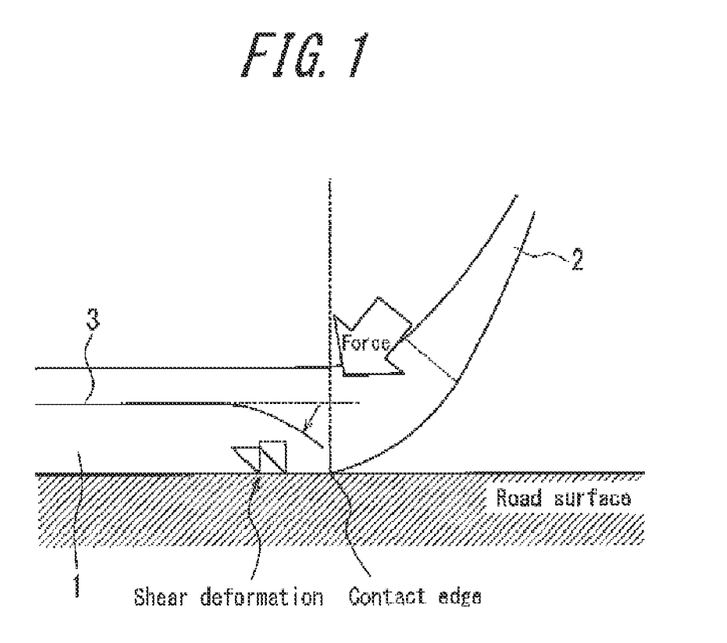
FIG. 1 is a schematic cross-sectional diagram in the width direction illustrating shear force in the tire width direction.

Furthermore, as illustrated in FIG. 1, in a pneumatic tire a tread portion 1 and tire side portion 2 are typically joined at an angle. Therefore, the force acting on the tire ground contact area from the tire side portion 2 yields a force pushing the belt 3 inward in the width direction. As a result, a shear force acts on the tread portion 1 in the width direction, causing rubber to undergo shear deformation in the width direction, which is another major reason for wear at the contact edge. This problem is particularly noticeable in tires with a highly rigid side portion, such as run flat tires.

Additionally, out of consideration for stability and wear resistance, the camber is typically aligned in tires, and tires are mounted with a variety of camber angles.

In particular, when the camber angle is large, the above-described force on the belt increases noticeably, thus causing the above uneven wear to progress.

Furthermore, it is also known that when riding a tire with a heavy load or low internal pressure accelerates uneven wear.

To address these problems, Patent Literature 1, for example, discloses a technique for suppressing uneven wear by changing the shape of the tire's crown portion so that the above difference in radius decreases.

CITATION LIST

Patent Literature

PTL 1: JP2001138712A

SUMMARY OF INVENTION

However, decreasing the difference in radius by changing the shape of the crown portion, as in the invention disclosed in Patent Literature 1, also increases the contact length of the shoulder portions, leading to the problem of a reduction in performance characteristics such as comfort and stability.

Therefore, there is a demand for a method to suppress local tire wear without changing the shape of the crown portion.

The present invention has been conceived in light of the above problems, and it is an object thereof to provide a pneumatic tire with enhanced resistance to uneven wear.

In order to achieve the above object, the inventor diligently studied a method for suppressing the above shear deformation of rubber in the circumferential direction and the width direction.

As a result, the inventor first discovered that providing at least one half, in the tire width direction, of the outermost reinforcing layer in the tire radial direction with a portion curved convexly outward in the tire radial direction allows for a narrowing of the interval between the outermost reinforcing layer in the radial direction and the tread outer contour line, reducing the shear force in the tire circumferential direction and enhancing the tire's resistance to uneven wear.

After thoroughly investigating the causes of shear deformation of rubber in the width direction, the inventor also discovered that in addition to the above-described force pushing the belt inward, a compression force between the outermost reinforcing layer in the tire radial direction and the tire ground contact area is a cause of shear deformation of rubber in the width direction.

The inventor then discovered that shaping the outermost reinforcing layer so as to extend inward in the tire radial direction from the top of the curved portion to the edge of the outermost reinforcing layer allows for suppression of shear deformation of rubber in the width direction by changing the movement of the deformation of rubber due to the above-described compression force between the outermost reinforcing layer and the tire ground contact area.

In other words, the inventor discovered that making the tread thinner from the tire equatorial plane to near the contact edge and making the tread thicker from near the contact edge to the position, in the width direction, of the edge of the outermost reinforcing layer allows for suppression of the above-described shear deformation of rubber in the width direction.

The present invention is based on the above discoveries, and primary features thereof are as follows.

(1) A pneumatic tire comprising a pair of bead portions, a carcass extending toroidally between the bead portions, and a plurality of reinforcing layers and a tread disposed in order radially outside a crown portion of the carcass, wherein when the tire is mounted on a standard rim with 5% of standard internal pressure applied, at least one half, in a tire width direction, of an outermost reinforcing layer located outermost in a tire radial direction among the plurality of reinforcing layers includes a curved portion, curved convexly outward in the tire radial direction, and extends inward in the tire radial direction from a top of the curved portion to an edge of the outermost reinforcing layer.

Here, a "standard rim" refers to a regulation rim (or "approved rim", "recommended rim") of applicable size listed in predetermined industrial standards. Standard internal pressure refers to the air pressure corresponding to the maximum load (maximum load capability) for a single wheel of applicable size listed in the same standards.

Maximum applied load, described below, refers to the maximum load (maximum load capability) for a single wheel of applicable size listed in the same standards.

The industrial standards are determined by valid standards for the region in which the tire is produced or used, such as "The Tire and Rim Association, Inc. Year Book" in the United States of America (including the design guide), "The European Tyre and Rim Technical Organisation Standards Manual" in Europe, and the "JATMA Year Book" of the Japan Automobile Tire Manufacturers Association in Japan.

(2) The pneumatic tire according to (1), wherein along the tire width direction, an interval in the tire radial direction between the outermost reinforcing layer and an outer contour of the tread gradually decreases from a tire equatorial plane to the top of the curved portion and gradually increases from the top of the curved portion to an outermost belt edge.

(3) The pneumatic tire according to (1), wherein when the tire is mounted on a standard rim with standard internal pressure applied and bears a load of 80% of a maximum applied load, each edge along a maximum width of a tire ground contact area is defined as a contact edge, and
an interval in the tire radial direction between the outermost reinforcing layer and an outer contour of the tread satisfies the relationships $$0.3 \leq d2/d1 < 1$$

and $$1 < d3/d2 \leq 1.5$$

where the interval is d1 mm at a tire equatorial plane, d2 mm at the top of the outermost reinforcing layer, and d3 mm at the edge of the outermost reinforcing layer.

(4) The pneumatic tire according to (1), wherein a width of the curved portion in the tire width direction is from 15% to 100% of a width of the outermost reinforcing layer in the tire width direction within the half, in the tire width direction, that includes the curved portion.

According to the present invention, it is possible to provide a pneumatic tire that balances tire wear life with resistance to uneven wear of the tire.

BRIEF DESCRIPTION OF DRAWINGS

The present invention will be further described below with reference to the accompanying drawings, wherein.

DESCRIPTION OF EMBODIMENTS

The following describes a pneumatic tire for passenger cars (hereinafter simply referred to as a tire) according to the present invention in detail with reference to the drawings.

Figure 2:
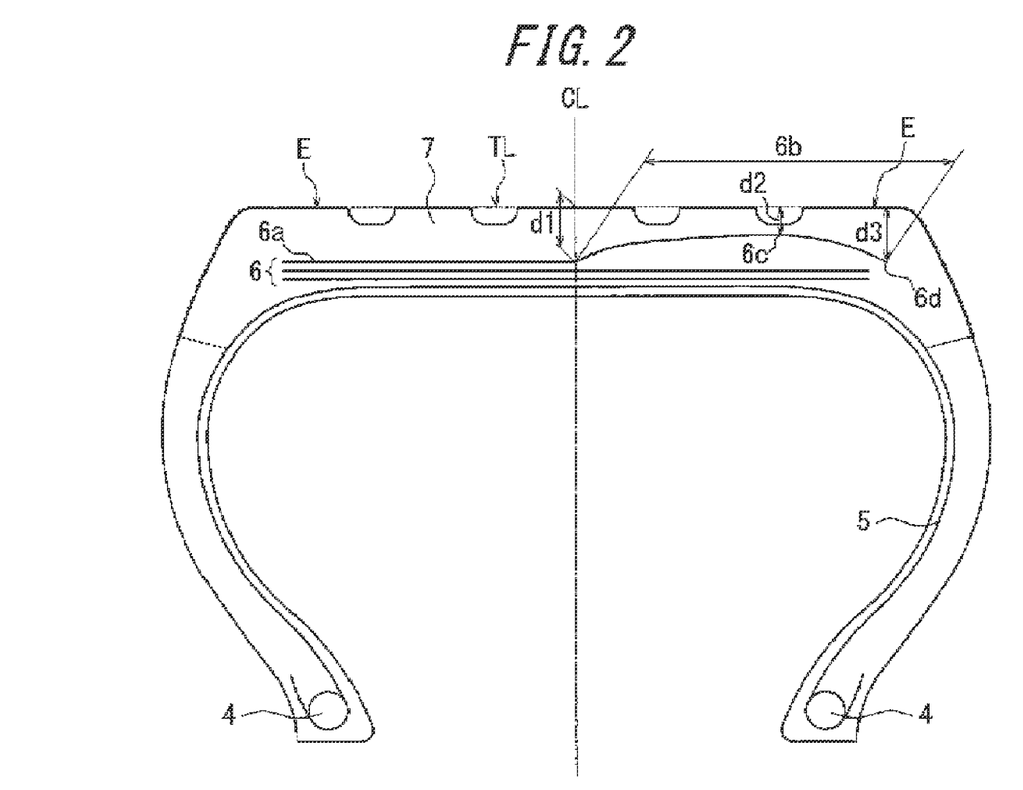
FIG. 2 is a cross-sectional diagram in the width direction illustrating a pneumatic tire according to an embodiment of the present invention.

FIG. 2 is a cross-sectional diagram in the width direction illustrating a pneumatic tire according to an embodiment of the present invention, schematically showing the tire mounted on a standard rim, with 5% of standard internal pressure and no load applied.

As illustrated in FIG. 2, a tire according to the present invention is provided with a pair of bead portions 4, a carcass 5 extending toroidally between the bead portions 4, and a plurality of reinforcing layers 6 and a tread 7 disposed in this order on the outside of the carcass 5 in the tire radial direction. Three reinforcing layers 6 are shown in the example in FIG. 2.

In the example in FIG. 2, the reinforcing layers 6 are a belt layer formed by belt cords, covered in rubber, extending at an angle of 45° to 70°, preferably 60° to 70°, with respect to the tire circumferential direction.

As illustrated in FIG. 2, in the tire according to the present invention, among the reinforcing layers 6, a belt layer 6a that is outermost in the tire radial direction includes, in at least one of two halves divided by the tire equatorial plane CL in a cross-sectional diagram in the tire width direction, a portion 6b that curves convexly outward in the tire radial direction (hereinafter simply referred to as a curved portion).

In the example in FIG. 2, in only one half in the width direction, the entire half of the outermost belt layer 6a is curved convexly outward in the tire radial direction.

The outermost belt layer 6a extends inward in the tire radial direction from the top 6c of the curved portion 6b to an edge 6d of the outermost reinforcing layer 6a.

Here, in a cross-sectional diagram in the tire width direction, when viewing the shape of the outermost reinforcing layer in the tire radial direction, the "portion curved convexly outward in the tire radial direction" refers to the entire portion having a curve with a center of curvature positioned further inward in the tire radial direction than the outermost reinforcing layer.

In other words, a portion with a center of curvature further outward in the tire radial direction than the outermost reinforcing layer and a portion that does not have a finite curve are excluded.

As indicated by the dotted line in FIG. 2, a phantom line representing the surface of the tread 7 without any unevenness such as grooves, i.e. a line resulting from extending a line corresponding to the tread surface outward in the width direction along the surface of the tread 7, is denominated a tread outer contour line TL.

In the tire according to the present invention, along the tire width direction, the interval in the tire radial direction between the outermost belt layer 6a in the above-mentioned half and the tread outer contour line TL decreases from the tire equatorial plane CL to the top 6c of the curved portion 6b and increases from the top 6c of the curved portion 6b to the outermost belt edge 6d.

In the tire according to the present invention, it is essential that at least one half, in the tire width direction, of the outermost reinforcing layer in the tire radial direction thus includes a curved portion, curved convexly outward in the tire radial direction, and that the outermost reinforcing layer extends inward in the tire radial direction from the top of the curved portion to an edge of the outermost reinforcing layer.

The following describes the operations and effects of the present invention.

According to the tire of the present invention, first of all, since the outermost reinforcing layer includes the convexly curved portion, the interval between the outermost reinforcing layer and the tread surface decreases at the outside in the tire width direction.

Therefore, the circumferential shear force caused by relative displacement between the outermost reinforcing layer and the tread is reduced, allowing for suppression of local wear at the outside in the tire width direction.

Furthermore, with the above shape for the outermost reinforcing layer, the interval in the tire radial direction between the outermost belt layer and the tread outer contour line is small at the top of the curved portion and large from the top of the curved portion to the outermost belt edge.

It thus becomes difficult for the tread rubber to be displaced from the outside towards the inside in the width direction, thereby suppressing the shear deformation in the width direction due to tread rubber being pushed from the outside towards the inside in the width direction as a result of the above-described compression stress between the outermost reinforcing layer and the tread.

According to the present invention, it is thus possible to suppress shear deformation of tread rubber, which causes uneven wear, in the circumferential direction and the width direction so as to enhance the tire's resistance to uneven wear.

Tread width can also be guaranteed at the belt edge, the position in the tire width direction most susceptible to wear, thereby extending the wear life.

Here, the curved portion of the outermost reinforcing layer is not particularly limited. For example, rubber may be disposed radially outwards from the carcass so as to cause the entire belt to be curved. Alternatively, the curved portion may be formed by, for example, positioning the turn back end of the carcass radially inwards from the outermost reinforcing layer near the edge thereof.

Figure 3:
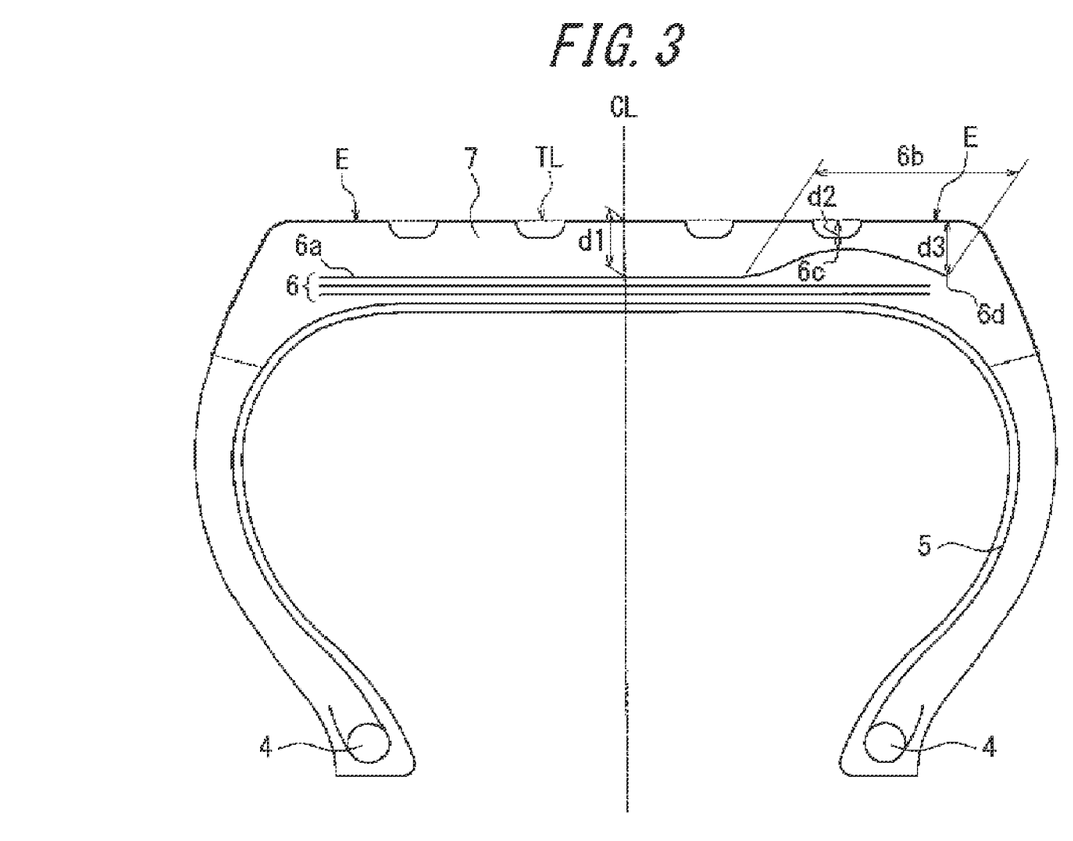
FIG. 3 is a cross-sectional diagram in the width direction illustrating a pneumatic tire according to an embodiment of the present invention.

FIG. 3 is a cross-sectional diagram in the width direction illustrating a tire according to another embodiment of the present invention.

As illustrated in FIG. 3, in a tire of the present invention, it is possible for only a portion of one half, in the tire width direction, of the outermost reinforcing layer 6a to be curved.

In this case as well, as in the tire illustrated in FIG. 2, the interval between the outermost reinforcing layer and the tread surface in this half decreases at the outside in the tire width direction. Furthermore, at the outside in the tire width direction, the interval from the tread outer contour line in the tire radial direction decreases. Accordingly, it is possible to enhance the resistance to uneven wear and the wear life.

Figure 4:
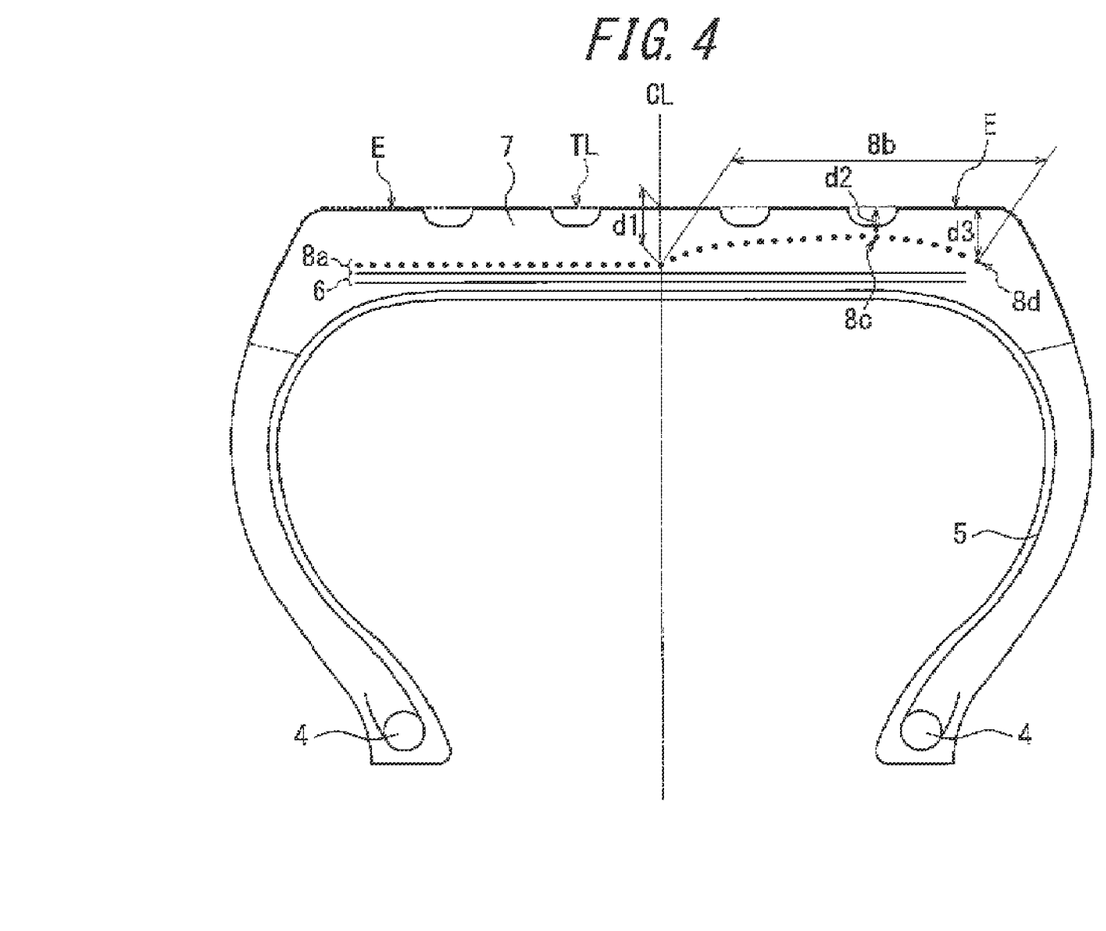
FIG. 4 is a cross-sectional diagram in the width direction illustrating a pneumatic tire according to an embodiment of the present invention.

FIG. 4 is a cross-sectional diagram in the width direction illustrating a tire according to yet another embodiment of the present invention.

The tire illustrated in FIG. 4 differs from the tire illustrated in FIG. 2 in that the outermost reinforcing layer in the tire radial direction is a belt reinforcing layer 8a.

In the example in FIG. 4, the belt reinforcing layer 8a is formed from cords extending approximately in the tire circumferential direction and covered in rubber.

When the outermost reinforcing layer is a belt reinforcing layer as in the tire illustrated in FIG. 4, it is possible as well to enhance the resistance to uneven wear and the wear life through the same operations and effects as when the outermost reinforcing layer is a belt layer.

Figure 5:
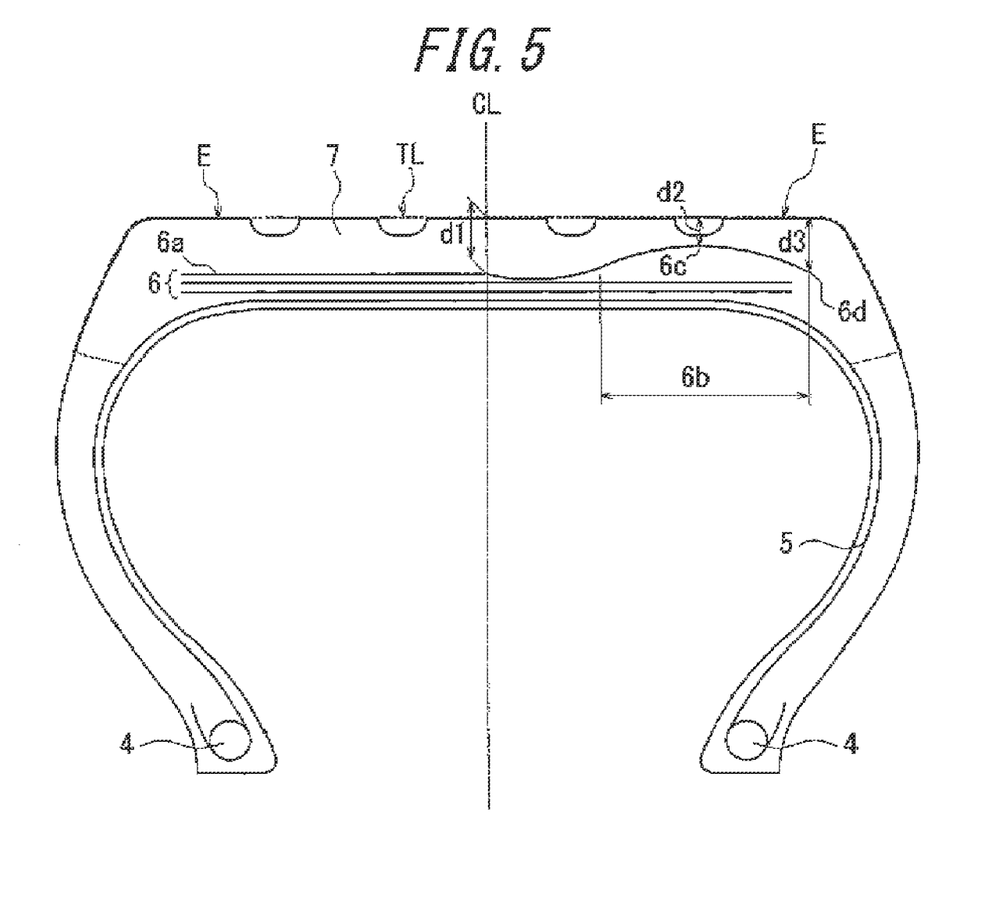
FIG. 5 is a cross-sectional diagram in the width direction illustrating a pneumatic tire according to an embodiment of the present invention.

FIG. 5 is a cross-sectional diagram in the width direction illustrating a tire according to another embodiment of the present invention.

The tire illustrated in FIG. 5 differs from the tire illustrated in FIG. 2 by including a portion curved convexly inwards in the tire radial direction in a range from the tire equatorial plane CL to the top 6c.

With the tire illustrated in FIG. 5 as well, as in the tire illustrated in FIG. 2, the interval between the outermost reinforcing layer and the tread surface in the above-mentioned half decreases at the outside in the tire width direction. Furthermore, at the outside in the tire width direction, the interval from the tread outer contour line in the tire radial direction decreases. Accordingly, local wear decreases, allowing for enhancement of the resistance to uneven wear and the wear life.

In the tire according to the present invention, the interval in the tire radial direction between the outermost reinforcing layer and the tread outer contour line TL preferably gradually decreases from the tire equatorial plane CL to the top 6c of the curved portion 6b and gradually increases from the top 6c of the curved portion 6b to the outermost belt edge, as in the tire illustrated in FIG. 2. The reason is that having the interval gradually decrease, so that the circumferential length of the outermost reinforcing layer gradually increases, from the tire equatorial plane CL to the top 6c of the curved portion 6b is effective in order to decrease the circumferential shear force, whereas having the interval gradually increase from the top 6c to the outermost belt edge is more effective in order to suppress deformation of the rubber due to the above-described compression force.

As illustrated in FIG. 2, the interval in the tire radial direction between the outermost reinforcing layer 6a and the tread outer contour line TL preferably satisfies the relationships $$0.3 \leq d2/d1 < 1$$

and $$1 < d3/d2 \leq 1.5$$

where, along the tire width direction, the interval is d1 mm at the tire equatorial plane CL, d2 mm at the top 6c, and d3 mm at the width direction edge 6d of the outermost reinforcing layer.

The reason is that when a groove is provided in the top region, setting d2/d1 to be 0.3 or greater makes it possible to guarantee the depth of the groove and to guarantee wear life.

On the other hand, setting d2/d1 to be less than 1 allows for a greater reduction in the above-described circumferential shear force caused by the relative displacement between the outermost reinforcing layer and the tread.

Furthermore, setting d3/d2 to be greater than 1 allows for greater suppression of the width direction shear deformation of the tread rubber due to the above-described compression stress, whereas setting d3/d2 to be 1.5 or less makes it possible to guarantee durability at the edge of the outermost belt.

When the tire is mounted on a standard rim with standard internal pressure applied and bears a load of 80% of the maximum applied load, each edge along a maximum width of the tire ground contact area is defined as a contact edge E. The contact width is defined as the maximum width in the width direction of the tire ground contact area when the tire is mounted on a standard rim with standard internal pressure applied and bears a load of 80% of the maximum applied load.

The position in the width direction at the top 6c of the curved portion 6b is preferably further outside in the width direction than the middle of the tread half width (i.e. the ¼ point) and on the inside of the contact edge E by 5% or more of half of the contact width.

By positioning the top 6c further outside in the width direction than the middle of the tread half width, the interval between the outermost reinforcing layer and the tread surface is smaller at the outside in the tire width direction than at the middle of the tread half width.

Furthermore, the interval in the tire radial direction between the outermost reinforcing layer and the tread outer contour line is smaller at the outside in the tire width direction than at the middle of the tread half width.

Therefore, it is possible to suppress the shear deformation of rubber in the circumferential direction and in the width direction at a location where local wear occurs easily, thereby further enhancing resistance to uneven wear.

On the other hand, by positioning the top 6c to be on the inside of the contact edge E by 5% or more of half of the contact width, it is possible to make the tread rubber thicker on the outside of this position in the width direction and thus to suppress the above-described displacement of rubber from the outside towards the inside in the width direction.

Note that in order to thicken the tread rubber, the outermost reinforcing layer preferably extends inwards in the tire radial direction at least from a position on the inside of the contact edge E by 5% or more of half of the contact width to a position on the outside, in the width direction, of the contact edge E by 5% of the tread width. This is because the resistance to uneven wear can be effectively enhanced by suppressing the above-described displacement of rubber from the outside towards the inside in the width direction at a location where such displacement is particularly large.

Furthermore, the width of the curved portion 6b in the tire width direction is preferably from 15% to 100% of the width of the outermost reinforcing layer 6a in the tire width direction within the half, in the tire width direction, in which the curved portion is located.

The reason is that a value of 15% or more brings out the effect of lessening the circumferential shear force through intersection of the belt.

Furthermore, the tire according to the present invention is preferably mounted on a vehicle so that the curved portion in the above-described outermost reinforcing layer is located at least on the side in which, due to the camber angle, the contact length extends, i.e. the half in which the above-described force pushing towards the tread portion from the side portion is strong.

In other words, in the case of positive camber, the tire is preferably mounted on the vehicle so that the curved portion in the above-described outermost reinforcing layer is located at least on the outside of the vehicle-mounted tire.

Conversely, in the case of negative camber, the tire is preferably mounted on the vehicle so that the curved portion in the above-described outermost reinforcing layer is located at least on the inside of the vehicle-mounted tire.

The reason is that such a configuration more effectively suppresses shear deformation of the tread rubber in the width direction, thereby allowing for enhanced resistance to uneven wear in the tire.

EXAMPLES

To verify the effects of the present invention, samples of tires according to the present invention and of tires serving as comparative examples were produced, and tests were performed to assess the resistance to uneven wear and the wear life of the tires.

First, as Inventive Examples 1 and 2, tires were produced with a structure such that, as illustrated in FIGS. 2 and 3, one half, in the tire width direction, of the outermost belt layer curves convexly outward in the radial direction, with a top at a position inwards in the width direction from the contact edge E by 20% of the tread width, and extends inward in the radial direction from the top to the outer edge in the width direction of the outermost belt layer.

In the tire of Inventive Example 1, the distance between the tread outer contour line and the outermost belt layer decreases gradually along the tire width direction from the tire equatorial plane CL to the top position, whereas the tire of Inventive Example 2 contains a portion in which the distance remains constant, without gradually decreasing.

With regards to the interval in the tire radial direction between the outermost reinforcing layer and the tread outer contour line in Inventive Examples 1 and 2, the above ratios are as follows: d2/d1=0.7 and d3/d2=1.2.

The width, in the tire width direction, of the curved portion in the outermost belt layer is 100% of the width, in the tire width direction, of the outermost belt layer in the half in which the curved portion is located in Inventive Example 1 and is 40% of the width, in the tire width direction, of the outermost belt layer in the half in which the curved portion is located in Inventive Example 2.

As Inventive Examples 3 and 5 to 10, tires were produced that differed from the tire of Inventive Example 1 only in the values of the above ratios d2/d1 and d3/d2.

Furthermore, as Inventive Examples 4 and 11, tires were produced that differed from the tire of Inventive Example 2 only in the width, in the tire width direction, of the curved portion in the outermost belt layer.

Table 1 lists the specifications of these tires.

Figure 6:
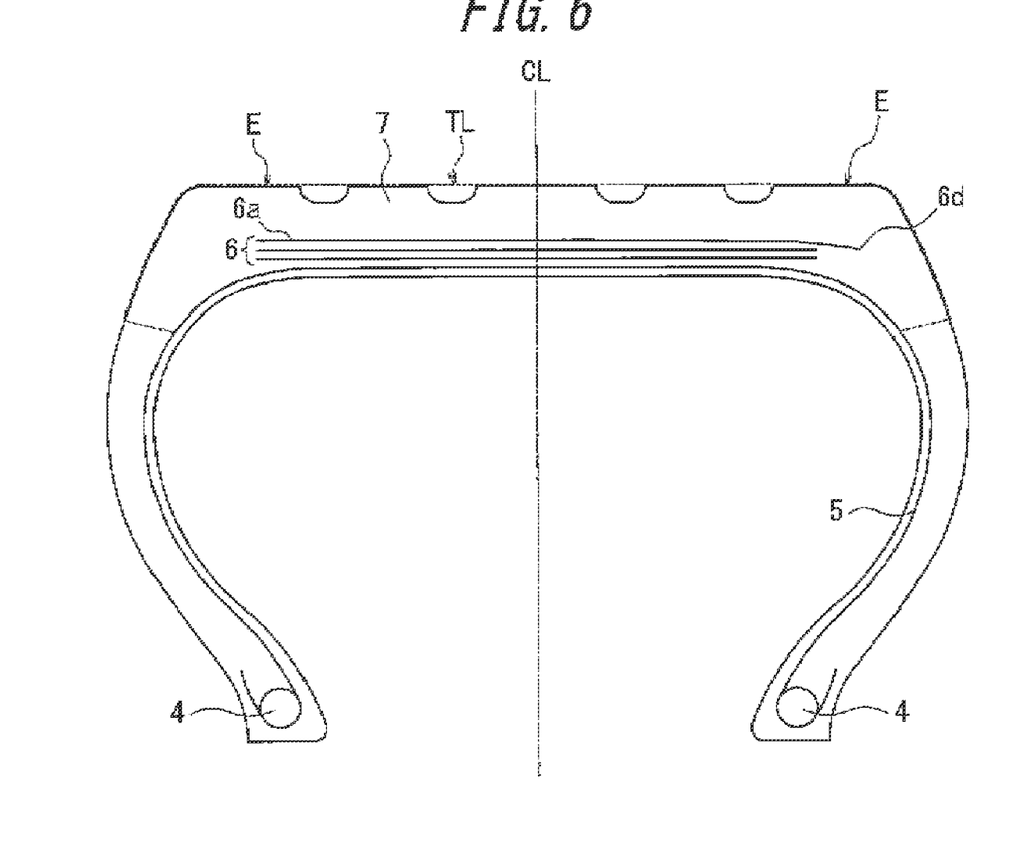
FIG. 6 is a cross-sectional diagram in the width direction illustrating the pneumatic tire of Comparative Example 2.
Figure 7:
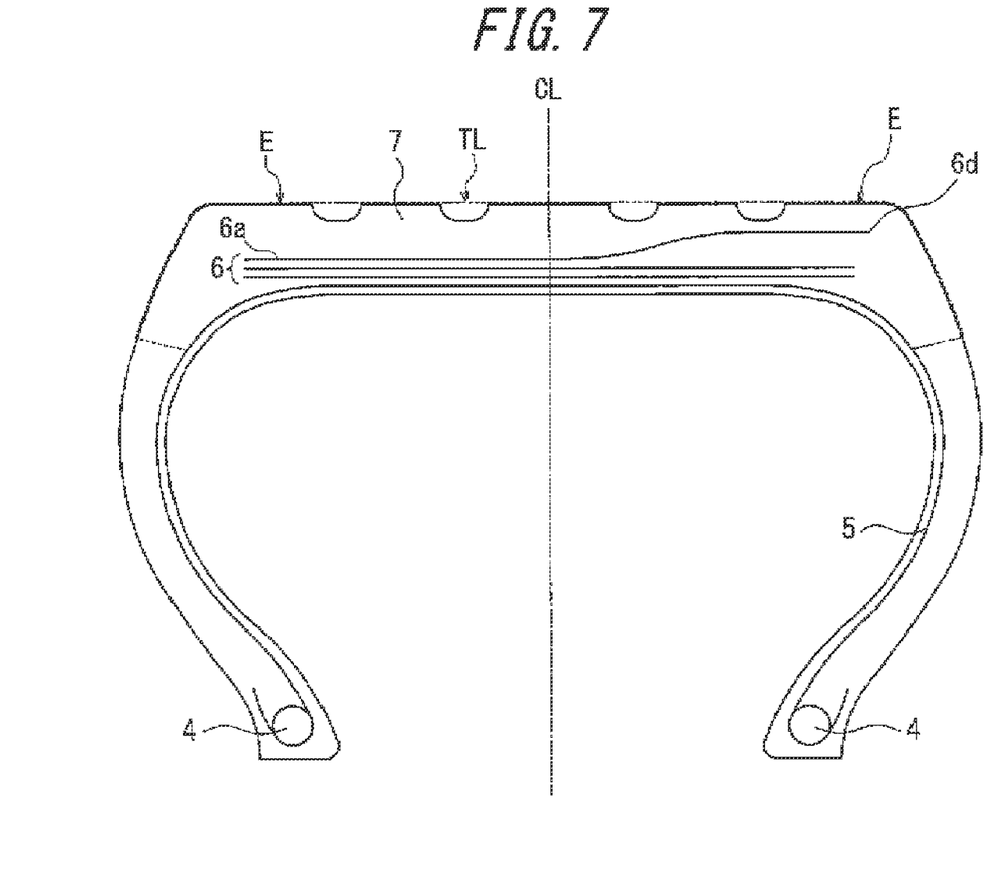
FIG. 7 is a cross-sectional diagram in the width direction illustrating the pneumatic tire of Comparative Example 1.

Tires having the structures respectively illustrated in FIGS. 7 and 6 were produced as Comparative Examples 1 and 2.

Unlike the tires of Inventive Examples 1 and 2, in the tires of Comparative Examples 1 and 2 the outermost belt layer is not curved outward in the tire radial direction. As a result, the interval between the outermost reinforcing layer and the tread surface does not decrease near the contact edge. In Comparative Example 1, in one half of the outermost belt layer in the width direction, the edge at the outside in the width direction does not extend inward in the tire radial direction.

Figure 8:
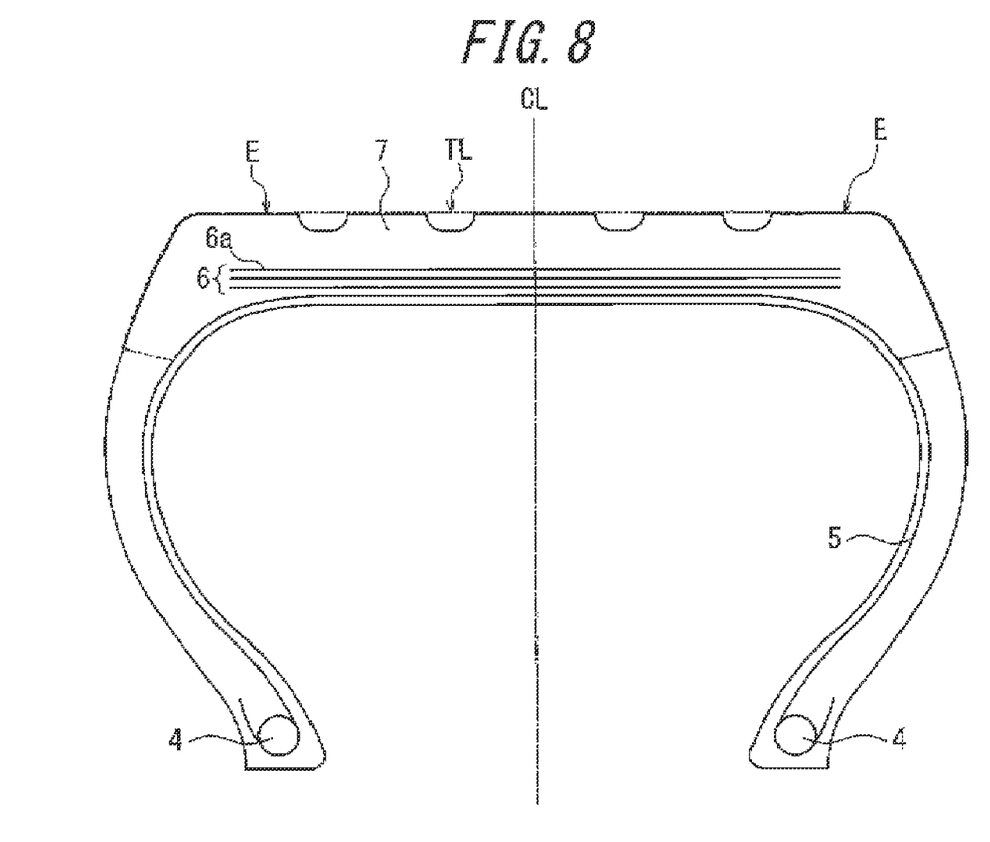
FIG. 8 is a cross-sectional diagram in the width direction illustrating the pneumatic tire of a Conventional Example.

Furthermore, a tire having the structure illustrated in FIG. 8 was produced as a Conventional Example. In the tire of the Conventional Example, the outermost belt layer does not extend in the radial direction.

Table 1 lists the specifications of each tire.

In Table 1, the "Width of Curved Portion (%)" refers to the ratio of the width, in the tire width direction, of the curved portion in the outermost belt layer to the width, in the tire width direction, of the outermost belt layer in the half in which the curved portion is located.

The value of d2 for Comparative Example 2 is the value measured at the same position in the tire width direction as the position in the width direction at which d2 is measured for Inventive Example 1.

TABLE 1

| | FIG. | Shape of Outermost Belt Layer | | d1 (mm) | d2 (mm) | d3 (mm) | d2/d1 | d3/d2 | Width of Curved Portion (%) |
|---|---|---|---|---|---|---|---|---|---|
| Inventive Example 1 | FIG. 2 | Includes portion curved convexly | Edge extends inward in radial direction | 10 | 7 | 8.4 | 0.7 | 1.2 | 100 |
| Inventive Example 2 | FIG. 3 | Includes portion curved convexly | Edge extends inward in radial direction | 10 | 7 | 8.4 | 0.7 | 1.2 | 40 |
| Inventive Example 3 | FIG. 2 | Includes portion curved convexly | Edge extends inward in radial direction | 10 | 5 | 6 | 0.5 | 1.2 | 100 |
| Inventive Example 4 | FIG. 3 | Includes portion curved convexly | Edge extends inward in radial direction | 10 | 7 | 8.4 | 0.7 | 1.2 | 10 |
| Inventive Example 5 | FIG. 2 | Includes portion curved convexly | Edge extends inward in radial direction | 10 | 9.5 | 11.4 | 0.95 | 1.2 | 100 |
| Inventive Example 6 | FIG. 2 | Includes portion curved convexly | Edge extends inward in radial direction | 10 | 7 | 7.35 | 0.7 | 1.05 | 100 |

TABLE 1-continued

| | FIG. | Shape of Outermost Belt Layer | | d1 (mm) | d2 (mm) | d3 (mm) | d2/d1 | d3/d2 | Width of Curved Portion (%) |
|---|---|---|---|---|---|---|---|---|---|
| Inventive Example 7 | FIG. 2 | Includes portion curved convexly | Edge extends inward in radial direction | 10 | 7 | 10.5 | 0.7 | 1.5 | 100 |
| Inventive Example 8 | FIG. 2 | Includes portion curved convexly | Edge extends inward in radial direction | 10 | 7 | 11.2 | 0.7 | 1.6 | 100 |
| Inventive Example 9 | FIG. 2 | Includes portion curved convexly | Edge extends inward in radial direction | 10 | 2.5 | 3 | 0.25 | 1.2 | 100 |
| Inventive Example 10 | FIG. 2 | Includes portion curved convexly | Edge extends inward in radial direction | 10 | 3 | 3.6 | 0.3 | 1.2 | 100 |
| Inventive Example 11 | FIG. 3 | Includes portion curved convexly | Edge extends inward in radial direction | 10 | 7 | 8.4 | 0.7 | 1.2 | 15 |
| Comparative Example 1 | FIG. 7 | Does not include portion curved convexly | Edge does not extend inward in radial direction | 10 | 7 | 7 | 0.5 | 1 | — |
| Comparative Example 2 | FIG. 6 | Does not include portion curved convexly | Edge does not extend inward in radial direction | 10 | 11 | 13.2 | 1.1 | 1.2 | — |
| Conventional Example | FIG. 7 | Does not include portion curved convexly | Edge does not extend inward in radial direction | 10 | 10 | 10 | 1 | 1 | — |

Note that as illustrated in the figures, each tire has a typical, conventional structure except for the outermost belt layer. Furthermore, the outermost reinforcing layer of each tire is a belt layer.

As illustrated in the figures, in the tires of Inventive Examples 1 to 11 and Comparative Examples 1 to 2, the interval between the tread contour line and the outermost belt layer is constant in one of two halves, in the tire width direction, divided by the tire equatorial plane CL and varies along the width direction in a portion of the other half.

The resistance to uneven wear of the tire was assessed as follows.

Resistance to Uneven Wear

The above tires with a size of 245/45ZR18 were mounted on a standard rim, and an internal pressure of 290 kPa was applied.

A load of 6 kN was then applied to each tire, and while rolling the tire at a speed of 3 m/min, the frictional energy E1 at the tread edge and the frictional energy E2 at the tread central portion were measured. The ratio E1/E2 was then calculated.

Note that the wheels of the vehicle on which the tires of the Inventive Examples, Comparative Examples, and Conventional Example were mounted were aligned to have negative camber. A camber angle of 2.7°, as per a tread observation device, was provided.

The tires according to the Inventive Examples and the Comparative Examples were mounted onto the vehicle so that in the outermost belt layer, the portion curved convexly outward in the radial direction and the portion extending radially inward were located on the inside of the vehicle-mounted tire.

Table 2 lists the assessment results. In Table 2, the numerical values represent E1/E2 as an index, with the conventional example as 100. A larger value indicates better resistance to uneven wear.

TABLE 2

| | Resistance to Uneven Wear |
|---|---|
| Inventive Example 1 | 196 |
| Inventive Example 2 | 167 |
| Inventive Example 3 | 167 |
| Inventive Example 4 | 104 |
| Inventive Example 5 | 130 |
| Inventive Example 6 | 146 |
| Inventive Example 7 | 200 |
| Inventive Example 8 | 211 |
| Inventive Example 9 | 103 |
| Inventive Example 10 | 118 |
| Inventive Example 11 | 109 |
| Comparative Example 1 | 80 |
| Comparative Example 2 | 87 |
| Conventional Example | 100 |

As shown in Table 2, the tires of Inventive Examples 1 to 11 all have better resistance to uneven wear than the tires of the Conventional Example and of Comparative Examples 1 and 2.

In Inventive Example 1, along the tire width direction, the interval in the tire radial direction between the outermost reinforcing layer and the tread outer contour line gradually decreases from the tire equatorial plane to the top of the curved portion and gradually increases from the top of the curved portion to the outermost belt edge, and Table 2 shows that Inventive Example 1 has even better resistance to uneven wear than Inventive Example 2.

Next, a test to assess the wear life of Inventive Examples 9 and 10 was performed.

Wear life was assessed as follows.

Wear Life

The above tires with a size of 245/45ZR18 were mounted on a standard rim, and an internal pressure of 290 kPa was applied.

A load of 6 kN was then applied to each tire, and while rolling the tire at a speed of 3 m/min, the frictional energy E1 at the tread edge was measured.

The ratio of the depth of the outermost groove in the tire width direction to the frictional energy E1 was calculated, and wear life was assessed as an index with the ratio for the tire of Inventive Example 9 as 100. A larger index indicates a longer wear life.

Table 3 lists the assessment results.

TABLE 3

| | Wear Life |
|---|---|
| Inventive Example 9 | 100 |
| Inventive Example 10 | 135 |

Table 3 shows that Inventive Example 10, in which the ratio d2/d1 is optimized, has a better wear life than Inventive Example 9.

Next, a test was performed to assess belt durability for Inventive Examples 7 and 8. Belt durability was assessed with an HSP durability test. A camber angle of 2° was provided, the speed was accelerated by 10 km/h every 20 min, and the belt durability was assessed as the speed at which failure occurred.

Table 4 lists the assessment results. In Table 4, the belt durability is represented as an index with the value for Inventive Example 8 as 100, and a larger value indicates better performance.

TABLE 4

|  | Belt Durability |
|---|---|
| Inventive Example 7 | 121 |
| Inventive Example 8 | 100 |

Table 4 shows that the tire of Inventive Example 7, for which the ratio d3/d2 was optimized, has better belt durability than the tire of Inventive Example 8.

Furthermore, Table 2 shows that Inventive Examples 2 and 11, for which the width of the curved portion in the outermost belt layer was optimized, have better resistance to uneven wear than Inventive Example 4.

REFERENCE SIGNS LIST

1: Tread portion
2: Tire side portion
3: Belt
4: Bead portion
5: Carcass
6: Reinforcing layer
7: Tread

The invention claimed is:

1. A pneumatic tire comprising
a pair of bead portions,
a carcass extending toroidally between the bead portions, and a plurality of reinforcing layers and a tread disposed in order radially outside a crown portion of the carcass,
wherein as a result of the tire being mounted on a standard rim with 5% of standard internal pressure applied, at least one half, in a tire width direction, of an outermost reinforcing layer located outermost in a tire radial direction among the plurality of reinforcing layers includes a curved portion, curved convexly outward in the tire radial direction, and extends inward in the tire radial direction from a top of the curved portion to an edge of the outermost reinforcing layer,
a number of the plurality of reinforcing layers is three,
the curved portion is only included in the outermost reinforcing layer,
wherein along the tire width direction, an interval in the tire radial direction between the outermost reinforcing layer and an outer contour of the tread gradually decreases from a tire equatorial plane to the top of the curved portion and gradually increases from the top of the curved portion to an outermost belt edge,
and wherein the outermost reinforcing layer is a belt reinforcing layer which is formed from cords extending in the tire circumferential direction and covered in rubber.

2. The pneumatic tire according to claim 1, wherein when the tire is mounted on a standard rim with standard internal pressure applied and bears a load of 80% of a maximum applied load, each edge along a maximum width of a tire ground contact area is defined as a contact edge, and
an interval in the tire radial direction between the outermost reinforcing layer and an outer contour of the tread satisfies the relationships $$0.3 < d2/d1 < 1 \text{ and}$$

$$1 < d3/d2 < 1.5$$

where the interval is d1 mm at a tire equatorial plane, d2 mm at the top of the outermost reinforcing layer, and d3 mm at the edge of the outermost reinforcing layer.

3. The pneumatic tire according to claim 1, wherein a width of the curved portion in the tire width direction is from 15% to 100% of a width of the outermost reinforcing layer in the tire width direction within the half, in the tire width direction, that includes the curved portion.

4. The pneumatic tire according to claim 1, wherein a width of the outermost reinforcing layer in the tire width direction is greater than that of any other reinforcing layer.

5. The pneumatic tire according to claim 1, wherein the curved portion is formed by positioning a turn back end of the carcass radially inwards from the outermost reinforcing layer near the edge thereof.

6. The pneumatic tire according to claim 1, wherein a width of the outermost reinforcing layer in the tire width direction is substantially the same as that of any other reinforcing layer.

* * * * *